(12) United States Patent
Muertter et al.

(10) Patent No.: US 12,252,070 B1
(45) Date of Patent: Mar. 18, 2025

(54) BLINKER MODULE

(71) Applicant: Off Road Engineering, LLC, Rancho Santa Margarita, CA (US)

(72) Inventors: Robert Eric Muertter, Rancho Santa Margarita, CA (US); Nathan Robert Cassens, Rancho Santa Margarita, CA (US)

(73) Assignee: Off Road Engineering, LLC, Rancho Santa Margarita, CA (US)

( * ) Notice: Subject to any disclaimer, the term of this patent is extended or adjusted under 35 U.S.C. 154(b) by 0 days.

(21) Appl. No.: 18/891,442

(22) Filed: Sep. 20, 2024

(51) Int. Cl.
*B60Q 1/34* (2006.01)
*B60Q 1/26* (2006.01)
*F21S 43/14* (2018.01)

(52) U.S. Cl.
CPC ............ *B60Q 1/343* (2013.01); *B60Q 1/2661* (2013.01); *B60Q 1/2696* (2013.01); *F21S 43/14* (2018.01)

(58) Field of Classification Search
CPC ........................... B60Q 1/26–343; F21S 43/14
See application file for complete search history.

(56) References Cited

U.S. PATENT DOCUMENTS 7,973,651 B2 * 7/2011 Stiles ................... B60Q 1/305
340/463

* cited by examiner

*Primary Examiner* — Jason M Han
(74) *Attorney, Agent, or Firm* — Benjamin Diederich

(57) ABSTRACT

A blinker module and a blinker kit, wherein the blinker module is attachable to a vehicle to control external turn signals. The blinker module has a lever and a plurality of switches to control external turn signals and other accessories, respectively.

17 Claims, 2 Drawing Sheets

BLINKER MODULE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present disclosure relates generally to a power distribution box, and more particularly to a steering column mountable power distribution box configured to send commands to a plurality of 12-volt accessories. Notably, the power distribution box, or blinker module, includes a lever, similar to a vehicle manufacturer's steering mounted wand to control blinker lights.

In general, offroad enthusiasts, in particular utility task vehicle (UTV) or side-by-side drivers are often riding solo in their vehicles and want to control their aftermarket accessories without removing their hands from the steering wheel, or otherwise reach away from their driver command center. As being produced, these vehicles commonly do not have any such mechanism by which to control their accessories.

In order to overcome these problems, various solutions have been introduced. For example, there have been produced aftermarket switch controllers to allow users of the UTVs to control their accessories, but they typically are mounted on the dash or a column of the vehicle's frame, necessitating removing one's hands from the steering wheel area in order to activate the accessories, or to have a passenger control the accessories. Furthermore, there have thus far not been available any suitable blinker light controllers for UTVs that allow for easy access and use by the driver, nor that have the capability of automatically shutting off the blinker light after a turn is completed.

As such, there is a need for an accessory control device that allows the driver of a UTV to keep their hands on/near the steering wheel while controlling the accessories as well as a blinker control device for UTVs that auto-terminates the blinker after the driver completes a turn.

BRIEF SUMMARY

In accordance with one embodiment of the present disclosure, there is contemplated a blinker module for controlling external turn signals. The blinker module includes a housing, a movable lever extending outward from one side of the housing, electronic components disposed within the housing to convey a position from the movable lever to the external signals, and a wire opening disposed on the rear of the housing. The wire opening is configured to make an electrical connection between the electronic components disposed within the housing to the external turn signals.

The blinker module may further include a plurality of switches disposed on a front face of the housing. The switches are in electrical connection with the electronic components disposed within the housing and are configurable to control accessories electrically connected to the electronic components via the wire opening. There may be four switches.

The blinker module may further include a plurality of indicator LEDs disposed on the front face of the housing.

The blinker module may further include a faceplate attached to the front face of the housing. The faceplate may be made from a polycarbonate.

The blinker module may further include a speaker.

The housing of the blinker module may be made from a lightweight, yet strong metal, such as aluminum. Furthermore, the housing may be configured to be removably attachable to a steering column of a vehicle. In certain instances, the vehicle may be a UTV.

The lever may be made from a lightweight, yet strong metal, such as aluminum.

In another embodiment of the present disclosure there is contemplated a blinker kit. The blinker kit includes a blinker module for controlling external blinker LEDs and four external blinker LEDs electrically attachable to the blinker module. The blinker module includes a housing, a movable lever extending outward from one side of the housing, electronic components disposed within the housing to convey a position from the movable lever to the external blinker LEDs, and a wire opening disposed on the rear of the housing. The wire opening is configured to make an electrical connection between the electronic components disposed within the housing to the external blinker LEDs.

The blinker kit may further include a plurality of switches disposed on a face of the housing of the blinker module. The switches are in electrical connection with the electronic components disposed within the housing and are configurable to control accessories electrically connected to the electronic components via the wire opening. In a certain embodiment, there may be four switches.

The blinker module of the blinker kit may further include a plurality of indicator LEDs disposed on a face of the housing. The blinker module may further include a speaker.

The housing of the blinker module in the blinker kit may be configured to be removably attachable to a steering column of a vehicle. In certain instances the vehicle is a UTV.

The four external blinker LEDs of the blinker kit may be configured to be removably attachable to external points of a vehicle for example a UTV.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
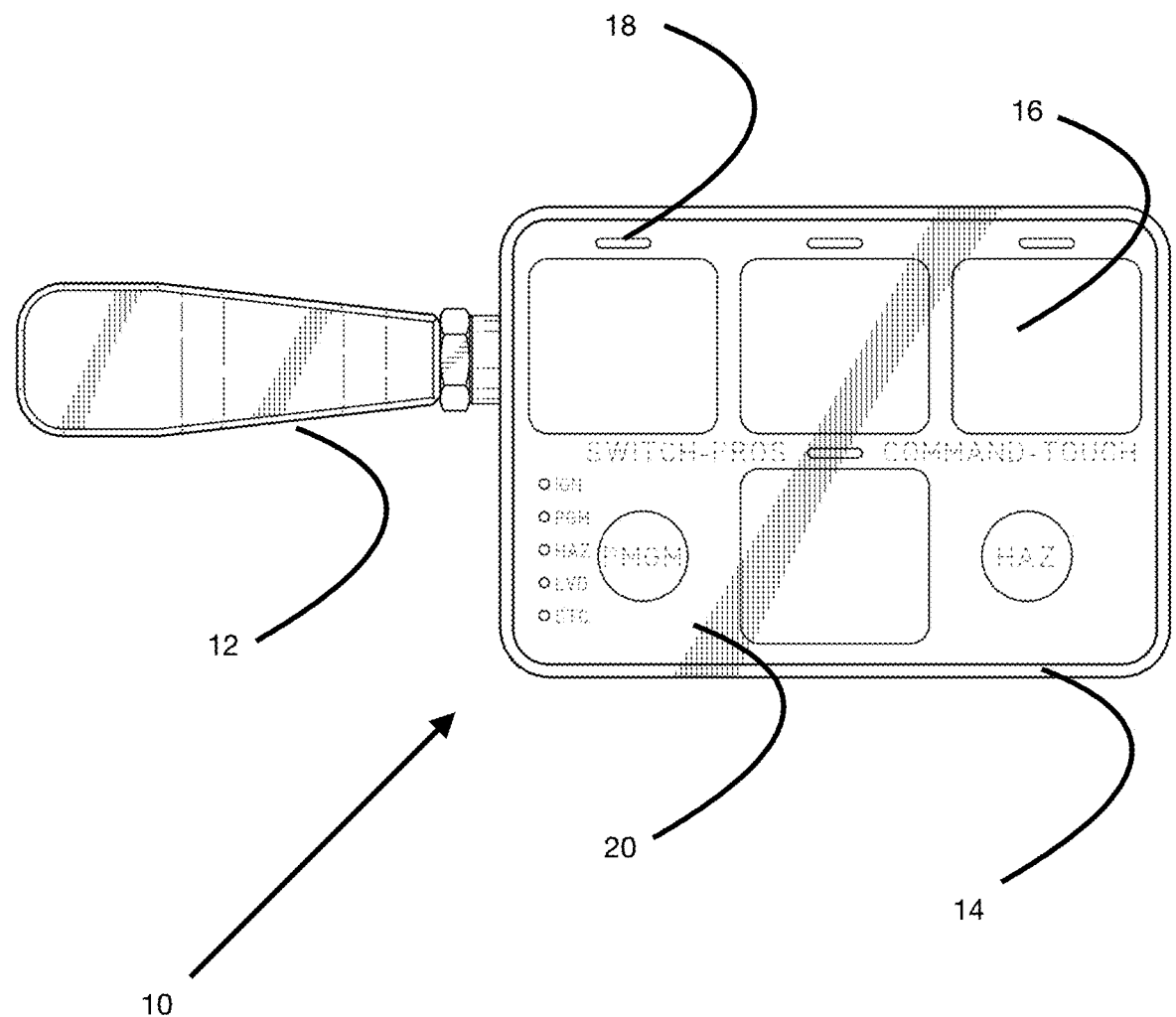
FIG. 1 is a front view of a blinker module as described herein.
Figure 2:
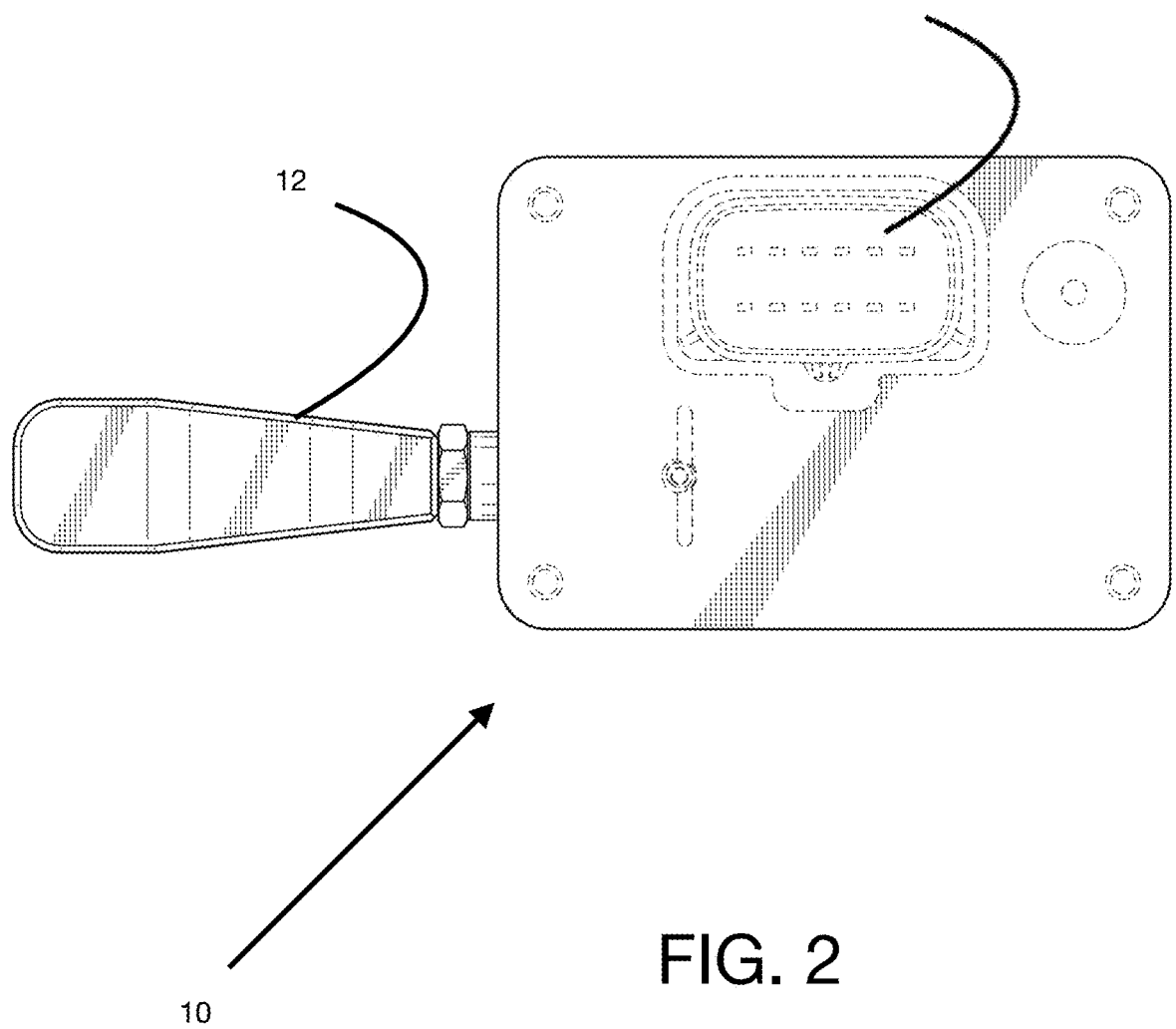
FIG. 2 is a rear view of a blinker module as described herein.

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

The blinker module 10 of the present disclosure is designed to be retrofitted and attached to a UTV (not shown) so that a driver of the UTV may utilize the functionality of the blinker module 10. In one embodiment the blinker module 10 is capable of being mounted to the steering column of the UTV. The blinker module 10 is a power distribution box designed to that a driver of a UTV may send commands to a plurality of 12-volt accessories (not shown) of the UTV.

One way of sending commands to the accessories is by way of a lever 12 mounted and attached to one side of a housing 14 of the blinker module. The lever 12 is similar to an automobile's steering mounted wand. The blinker module 10 also features components to allow for the automatic shutting off of a flashing behavior on an output light (not shown) connected to the blinker module 10. The blinker module 10 is capable of using various different technologies to sense when a turn has been completed and to thereby shut off the flashing behavior of an attached triggered light. In one example the blinking module 10 is configured to shut off the flashing behavior when it senses a turn of 50 degrees or greater, as would typically occur when a vehicle is making an on-road turn.

Furthermore, the blinker module 10 may include a plurality of on/off switches 16 for controlling additional accessories. Each switch 16 is capable of being programmed in various modes, for example, but not exclusively, a flash mode, a strobe mode, a momentary mode, and an on/off mode.

The uniqueness of a steering column mounted control box eliminates the need for dash space for mounting rocker, or other types of switches, in a vehicle with minimal space.

Addition of external turn signal indicator LEDs. The kit comes with its own turn signal indicators LEDS and will not use the vehicle's OEM lights to produce the flash for indicating a turn.

This system will include a printed circuit board (PCB) and one PIC (microcontroller) holding all switches 16, LEDs 18, and MOSFETS (not shown, internal). The user will be able to program the module 10 to the desired function. It will use a magnetometer and/or accelerometer to sense the vehicle's change of direction and allow for an auto-cancelling of a flashing output. It will also have a tiny speaker, which will make an audible tone indicating an output is still on and flashing.

This system includes a PCB, various electrical components, microcontrollers, connectors, wires, wiring harness, a housing enclosure 14, lever 12, overlay faceplate 20, and custom programming to create the desired output behaviors.

The lever 12 will send signals to the components, which are mounted on the PCB. These signals will communicate with the accessory outputs via a wiring harness, which connects to the back of the PCB through an opening 22 in the housing 14. The polycarbonate overlay faceplate 20 protects the internal components, but allows the operator to program the switches 16 and view the LEDs 18 which indicate activation status.

Once the operator wires the accessory outputs, and programs the behaviors, the lever 12 will switch the outputs on and off, based on commands from the operator.

The following is a description of a specific embodiment of the blinker module 10. In this embodiment the blinker module 10 is a self-contained programmable blinker/switch module 10 that is mountable on the steering column of a vehicle. It has a built in PCB with a microcontroller controlling four high side MOSFETs and two low side MOSFETs to switch four outputs. The module has 4 four LED indicators 18 showing the status of each switch 16 output. The lever 12 on the side of the module 10 controls the outputs, up/down and forward/backward to control the outputs. The blinker module can include two additional switched outputs 16 to activate accessories such as a horn, a light or a siren.

The blinker module 10 may also include a built-in piezo buzzer module to produce a blinker "click" sound using a DC voltage signal, when the blinker is active.

The blinker module 10 can be used as a stand-alone system without using the vehicle's OEM lights to produce the flash for indicating a turn. The kit can include its own turn signal indicator LED's harness for front and rear, left and right (not shown).

The blinker module 10 can also be used as a four-switch controller to turn on accessories. There is one PCB with one microcontroller holding all switches 16, LEDs 18 and MOSFETs. The user will be able to program the module 10 to the desired function. The module contains four LEDs 18 for switch output status, and five additional LEDs 18 for function status. The module 10 also includes two tactile switches 16 for a built-in hazard switch and one programming switch to activate the programming function.

Each of the switch output LED indicators 18 on the module has an outline below it to place a legend (sticker) to identify the function of each switch 16.

The system will also include a GPS/GNSS sensor, and/or a magnetometer and/or a accelerometer for a heading indication, for the blinker auto canceling function, in the Full Auto Blinker mode. The GPS/GNSS sensor can be remote mounted to the front of the vehicle. A magnetometer or accelerometer sensor could be placed on the blinker module PCB or it can also be remote mounted.

The GPS/GNSS sensor will provide speed, heading and location data to sense a right or left turn.

The magnetometer will provide a compass magnetic heading, or can also be used to sense a magnet mounted to the steering wheel to sense when the steering wheel returns to straight after a left or right turn is completed. The accelerometer will sense the G-force when making a turn. This accelerometer provides data when the turn is started and completed.

Items that can be programmed into the module:
a. Manual blinker mode, hazard, plus two switches. In this mode, the blinker is turned on and off manually.
b. Auto blinker mode (timed), hazard, plus two switches. Auto mode will turn the blinker on for a programmed period of time (for example, around 40 seconds), and give 3 flashes for a lane change when pressed momentarily for approximately 500 msec.
c. Fully Auto blinker mode, hazard, plus two switches. Fully Auto blinker mode uses a method, such as GPS/GNSS, or a magnetometer, or an accelerometer for heading data to turn the blinker off after a direction change of the vehicle.
d. No blinker mode, four switches.
e. Low voltage disconnect, for each switch. Only selected switches will have LVD. The default is for all to be on.
f. ON-OFF/Momentary, Default ON-OFF.
g. Flash for switches. Default OFF.
h. Strobe for switches. Default OFF.
i. Ignition or battery control. Default Ignition.
j. Output dimming. Default OFF.
k. Switch memory. Default OFF.
l. Low side switch programming for two switches. Switches a ground for low side switched loads.

The blinker module in this embodiment is a switchbox with a two-axis, four-position mom joystick switch (S1-S4) and also includes two tactile mom switches (S5, S6). S1-S4 controls Q1-Q4, S3-S4 also control Q5 and Q6, depending if S3 and S4 were programmed to switch a 12V signal or a ground. Q1-Q4 are high side MOSFETs, Q5-Q6 are low side switch MOSFETs. In this embodiment, Q1-Q4 have a current feedback, and Q5-Q6 do not have a current feedback.

LEDs 1-4 correspond to S1-S4. LED 5 turns on when an "IGNITION" signal is present and enables all switches, unless the switches were programmed to "BATTERY" control. LED 6 turns on when in programming mode. LED 7 turns on when S6 the "HAZARD" switch is pressed. LED 8 flashes when there is a low voltage condition, less than 11.0V. LED 9 turns on when the "HALL" sensor input goes low. It indicates that the steering wheel is centered.

In the "AUTO BLINKER" mode S1 and S2 will flash Q1 and Q2 after a momentary press. LED1 and LED2 will also flash anytime the blinker is active (right and left blinkers). The duration will be a defined duration in seconds. The frequency of the flash will be a defined frequency in msec. A short mom push of S1 or S2, less than 500 msec long, will create 3 flashes for a lane change. A long mom push of S1 or S2 will create a long flash time. The number of flashes for the long push will be a defined amount, with a default of 30 flashes. The blinker flashes can be canceled by the corresponding switch.

In the "Full AUTO BLINKER" mode a GPS/GNSS or magnetometer or accelerometer sensor is used to detect the heading to auto cancel the signal. When S1 or S2 (right turn or left turn) are pressed Q1 or Q2 will flash accordingly. A short mom push of S1 or S2, less than 400 msec long will create 3 flashes for a lane change. A long mom push of S1 or S2 will start the AUTO blinker function.

Pressing the "HAZARD" switch in either blinker modes will flash Q1 and Q2 outputs and flash LED 1 and LED 2, regardless of Ignition signal. It will override any inputs from S1 and S2.

In both blinker modes the LED indicators for S1 and S2, LED1 and LED2 will flash when the blinker is activated, depending on which switch was activated.

Whenever the blinkers, or the hazard is on, a pulsed signal with the same frequency is sent to RC3, Q7 for an audible signal.

There should be a sleep mode to reduce current consumption, the system will wake-up from any button push or ignition signal.

Pressing the Program switch 3 times will enter the LED indicator dimming function. S1 and S2 adjust the brightness of all the LEDs. While a fourth press exits the mode.

Pressing and holding both the program switch and the hazard switch for 7 seconds sets the module back to default values. The Hazard switch is disabled when the blinker modes are off, except for resetting the module back to default.

Programming:

The following is a representative programming sequence:
1. Blinker mode, Manual, Full Auto, Auto or OFF.
2. Ign/Battery
3. ON/OFF/Momentary
4. LVD
5. Flash
6. Strobe
7. Dimming
8. Memory
9. Power up switch status
10. Low side switches Notes regarding the programming:
1. To exit the programming mode at any time press and hold the programming switch for 5 seconds. All previous setting changes will be saved.
2. If one of the Blinker modes has been programmed, basically using S1 and S2, the following programming for ON/OFF/Momentary, Flash, Strobe, Dimming, Memory and power up switch status is only allowed for S3 and S4. S1 and S2 programming options for those functions are disabled.

Procedure to program the blinker module:
1. Press and hold the Program switch for 5 sec. The PGM LED will light up. The BKR LED will turn on.
   a. Program blinker mode: The BKR (STK) LED will turn on solid, indicating the default timed blinker mode. Press the Hazard button to change the setting to Auto Blinker, the BLK LED will start to flash. Press the Hazard button again to turn the blinker mode off and enabling all 4 switches, the BKR LED will turn off.
2. Press the Program switch again, short press. Program Ignition or Battery switch control. The IGN LED will turn on solid.
   a. Program Ignition or Battery control. All 4 switch indicators will light up indicating Ignition control for each switch. Use the switch lever to select between Ignition or battery control for each switch. Turning the switch LED indicator off will select Battery operation, meaning that the switch will operate without the Ignition On.
3. Press the Program switch again, short press. Program ON-OFF/Momentary for switch outputs. The PGM LED will turn on solid.
   a. Program ON-OFF/Momentary for each switch. Default is ON-OFF. Use the switch lever to turn on the ON-OFF/Momentary function for each switch. When the switch is selected, the switch indicator LED will turn on, indication the Momentary function has been programmed.
4. Press the Program switch again, short press. Program the LVD The LVD LED will turn on.
   a. Program the LVD, low voltage disconnect. All four switch LED indicators will turn on, indicating that the LVD is set for each switch. Use the switch lever to select or de-select the LVD for each switch.
5. Press the Program switch again, short press. Program Flash for switches. The PGM LED will flash.
   a. Program a FLASH for each switch. Default is NO flash. Use the switch lever to turn on the FLASH function for each switch. When the switch is selected, the switch indicator LED will also flash, indicating it was programmed to flash.
6. Press the Program switch again, short press. Program Strobe for switches. The PGM LED will strobe.
   a. Program Strobe for each switch. Default is NO strobe. Use the switch lever to turn on the STROBE function for each switch. When the switch is selected, the switch indicator LED will also strobe, indicating it was programmed to strobe.
7. Press the Program switch again, short press. Program Dimming for switch outputs. The PGM LED will gradually dim down to 20% then back up to 100% (if possible) and cycle.
   b. Program dimming for each switch. Default is NO dimming. Use the switch lever to turn on the DIMMING function for each switch. When the switch is selected, the switch indicator LED will turn on, indication the dimming function has been programmed.
8. Press the Program switch again, short press. Program MEMORY for each switch output. The PGM LED will turn on solid.

c. Program MEMORY for each switch. Default is NO memory. Use the switch lever to turn on the memory function for each switch. When the switch is selected, the switch indicator LED will turn on, indication the MEMORY function has been programmed.

9. Press the Program switch again, short press. Program Power Up Switch Status for each switch output. The PGM LED will turn on solid.

d. Program Power Up Switch Status for each switch. Default is OFF at power up. Use the switch lever to turn on the power up switch status function for each switch. When the switch is selected, the switch indicator LED will turn on, indication the power up switch status function has been programmed.

10. Press the Program switch again, short press. This will exit the programming of the blinker module.

The above description is given by way of example, and not limitation. Given the above disclosure, one skilled in the art could devise variations that are within the scope and spirit of the invention disclosed herein, including various ways of installing and configuring the electronic components within the blinker module. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A blinker module for controlling external turn signals of a utility task vehicle (UTV), said blinker module comprising:
   a) a housing;
   b) a movable lever extending outward from one side of the housing;
   c) electronic components disposed within the housing to convey a position from the movable lever to the external turn signals; and
   d) a wire opening disposed on the rear of the housing, said wire opening configured to make an electrical connection between the electronic components disposed within the housing to the external turn signals.

2. The blinker module of claim 1, further including a plurality of switches disposed on a face of the housing, said switches in electrical connection with the electronic components disposed within the housing, wherein said plurality of switches are configurable to control accessories electrically connected to the electronic components via the wire opening.

3. The blinker module of claim 2, wherein there are four switches.

4. The blinker module of claim 1, further including a plurality of indicator LEDs disposed on a face of the housing.

5. The blinker module of claim 1, further including a faceplate attached to a front face of the housing.

6. The blinker module of claim 5, wherein the faceplate is made from a polycarbonate.

7. The blinker module of claim 1, further including a speaker.

8. The blinker module of claim 1, wherein the housing is made from aluminum.

9. The blinker module of claim 1, wherein the housing is configured to be removably attachable to a steering column of the vehicle.

10. The blinker module of claim 1, wherein the lever is made from aluminum.

11. A blinker kit comprising:
   a) a blinker module for controlling external blinker LEDs, said blinker module comprising:
      i) a housing for mounting on a utility task vehicle (UTV);
      ii) a movable lever extending outward from one side of the housing;
      iii) electronic components disposed within the housing to convey a position from the movable lever to the external blinker LEDs; and
      iv) a wire opening disposed on the rear of the housing, said wire opening configured to make an electrical connection between the electronic components disposed within the housing to the external blinker LEDs; and
   b) four external blinker LEDs electrically attachable to the blinker module via the wire opening.

12. The blinker kit of claim 11, wherein the blinker module further includes a plurality of switches disposed on a face of the housing, said switches in electrical connection with the electronic components disposed within the housing, wherein said plurality of switches are configurable to control accessories electrically connected to the electronic components via the wire opening.

13. The blinker kit of claim 12, wherein there are four switches.

14. The blinker kit of claim 11, wherein the blinker module further includes a plurality of indicator LEDs disposed on a face of the housing.

15. The blinker kit of claim 11, wherein the blinker module further includes a speaker.

16. The blinker kit of claim 11, wherein the housing is configured to be removably attachable to a steering column of the vehicle.

17. The blinker kit of claim 11, wherein the four external blinker LEDs are configured to be removably attachable to external points of a vehicle.

* * * * *